United States Patent [19]

Komatsu

[11] Patent Number: 5,474,386
[45] Date of Patent: Dec. 12, 1995

[54] BEARING SYSTEM

[75] Inventor: Izumi Komatsu, Komagane, Japan

[73] Assignee: Sankyo Seiki Mfg. Co., Ltd., Nagano, Japan

[21] Appl. No.: 134,317

[22] Filed: Oct. 8, 1993

[30] Foreign Application Priority Data

Oct. 9, 1992 [JP] Japan ................. 4-076516 U

[51] Int. Cl.$^6$ ............................. F16C 33/02; F16C 35/02
[52] U.S. Cl. ...................... 384/276; 384/279; 384/428
[58] Field of Search ...................... 384/215, 220, 384/226–234, 276, 279, 295, 428, 504, 536, 535, 902

[56] References Cited

U.S. PATENT DOCUMENTS

| | | | |
|---|---|---|---|
| 3,022,542 | 2/1962 | Davis | 384/902 X |
| 3,074,768 | 1/1963 | Abel | 384/279 |
| 3,410,380 | 11/1968 | Kooistra | 384/536 X |
| 4,715,780 | 12/1987 | Kan | 384/536 X |
| 4,783,608 | 11/1988 | Gruber et al. | 384/215 X |
| 5,218,256 | 6/1993 | Umezawa et al. | 384/428 X |

FOREIGN PATENT DOCUMENTS 64-50646  3/1989  Japan .

*Primary Examiner*—Thomas R. Hannon
*Attorney, Agent, or Firm*—McAulay Fisher Nissen Goldberg & Kiel

[57] ABSTRACT

A bearing system comprises a motor shaft, bearings that support the shaft in a rotatable manner, a cylindrical bearing holder that holds the bearings and a cylindrical sleeve on the inner periphery of the bearing holder. The cylindrical sleeve is either made of metal of a material of high rigidity. The cylindrical sleeve, furthermore, is either integrally formed or press-fitted on the periphery of the bearing holder.

7 Claims, 2 Drawing Sheets

BEARING SYSTEM

BACKGROUND OF THE INVENTION a) Field of the Invention

The present invention relates to a bearing system used in motors for capstan drives of VTRs, tape recorders and the like.

b) Background Art

Conventionally, a bearing system such as shown in FIG. 3 is used in a motor for capstan drives of VTRs and tape recorders (cf. Jap. Utility Model Application Laid-open No. Sho 64-50646).

In FIG. 3, the reference number 1 denotes a shaft which acts as a capstan shaft of a VTR or a tape recorder. The shaft 1 is rotatably supported via metal bearings 4, 4 by a substantially cylindrical bearing holder 3 which rests on the base plate 12 via a collar 3a. A boss 5 is fixed on the base 1a of the shaft 1. The end of the base 1a which protrudes from the boss 5 abuts against a thrust bearing element 6, which prevents the shaft 1 from moving further downward in the figure.

The thrust bearing element 6 is attached to a substantially cylindrical and blind angle member 7 which fixed underneath the base plate 12. In FIG. 3, the reference number 8 denotes a rotor yoke which is fixed on the outer periphery of the boss 5, 9 a rotor magnet fixed on the inner periphery of the rotor yoke 8, 10 a stator core fixed on the bearing holder 3, 11 a wiring provided on each of the salient poles (not shown) on the stator core 10, and 13 a belt which is wound about an annular V-groove 5a formed on the outer periphery of the boss 5 which causes a reel table, etc. (not shown) to rotate.

A bearing system having the construction described above is defective in that, due to fluctuation in the molding precision of the bearing holder 3, it is difficult to axially align the shaft 1 which is held rotatable via the metal bearings 4, 4 with the bearing holding 3.

OBJECTS AND SUMMARY OF THE INVENTION

The present invention has been conceived and designed in view of the above mentioned situation and aims at providing a bearing system which enables easy and accurate axial alignment of the shaft with the bearing holder and which can easily be adapted to bearing holders of different shapes.

In accordance with the invention, a bearing system comprises a motor shaft, bearings that support the shaft in a rotatable manner, a cylindrical bearing holder that holds the bearings and a cylindrical sleeve on the inner periphery of the bearing holder. In one form of the invention, the cylindrical sleeve is made of metal and is press-fitted on the inner periphery of the bearing holder. In a second form of the invention, the cylindrical sleeve is made with a material of high rigidity and is press-fitted on the inner periphery of the bearing holder. In a third form of the invention, the cylindrical sleeve is made of metal and is integrally formed on the inner periphery of the bearing holder. In a fourth form of the invention, the cylindrical sleeve is made of a material which is highly rigid and is integrally formed on the inner periphery of the bearing holder.

For a better understanding of the present invention, reference is made to the following description and accompanying drawings while the scope of the invention will be pointed out in the appended claims.

DESCRIPTION OF THE PREFERRED EMBODIMENT

Figure 1A:
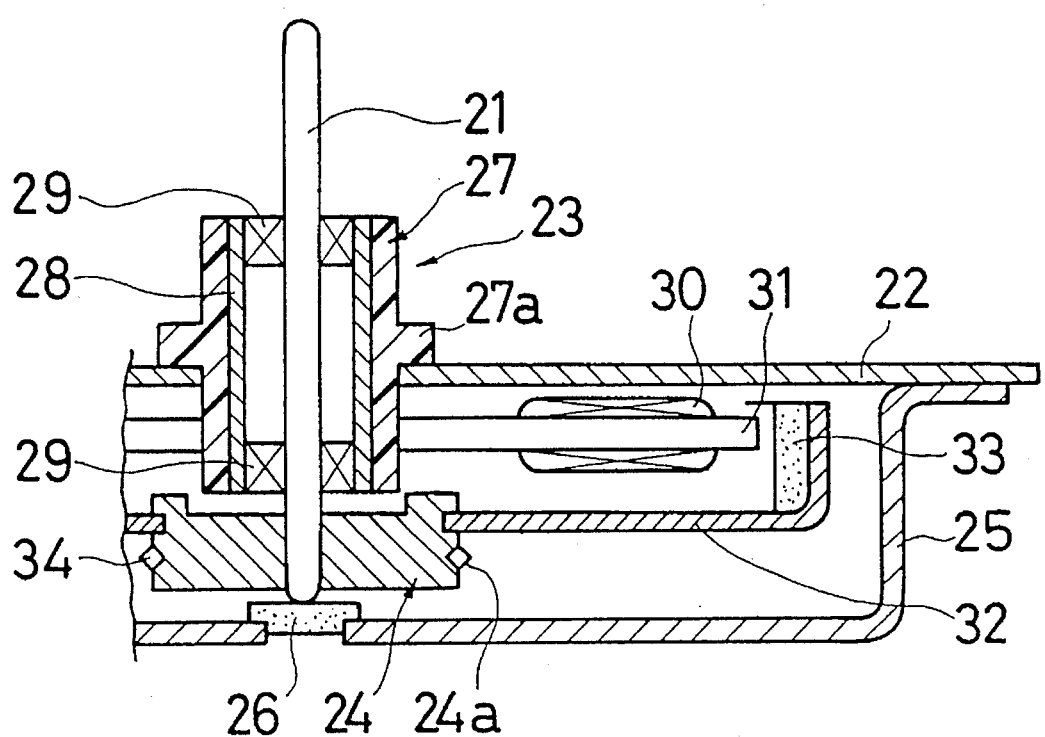
FIG. 1 illustrates a first embodiment of the bearing mechanism according to the present invention, with FIG. 1(A) showing the vertical sectional view of the essential parts of the motor and FIG. (1B) an exploded perspective view of the bearing section.
Figure 1B:
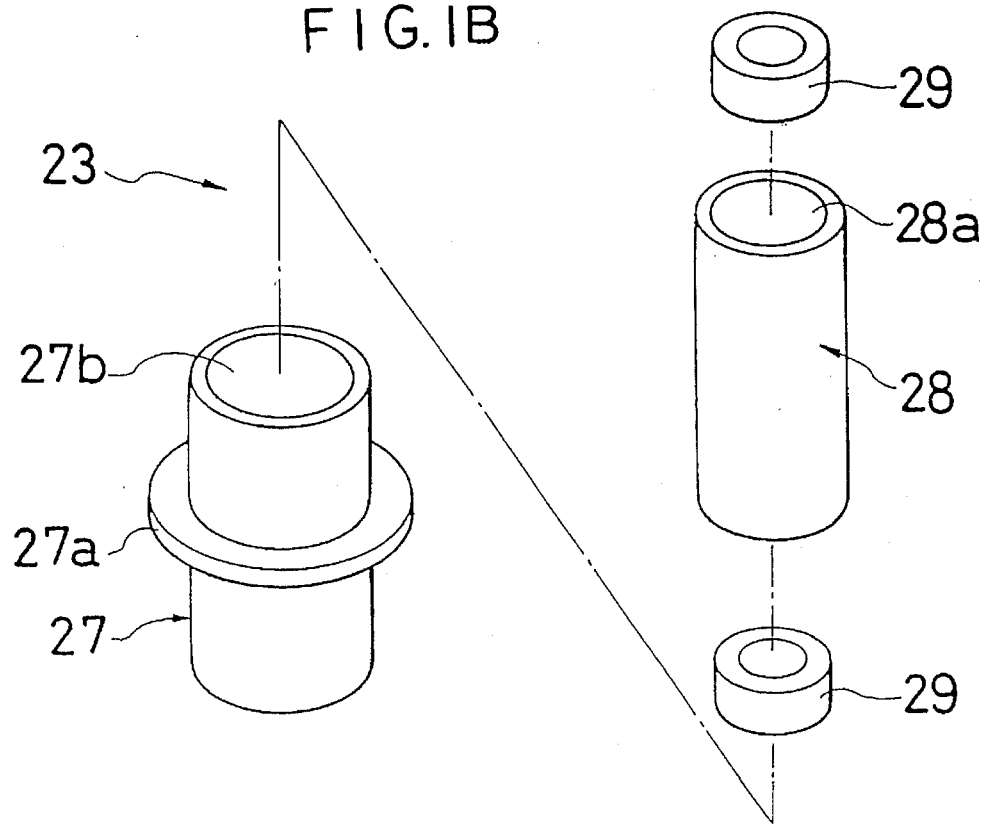

FIG. 1 shows an embodiment of the bearing system according to the present invention: FIG. 1(A) is a sectional view of the essential parts of the motor, and FIG. 1(B) and exploded perspective view to show the bearing section.

Referring to FIG. 1(A), a shaft 21 which acts as the capstan shaft of a VTR or a tape recorder is rotatably held on a base plate 22 that comprises a circuit plate constituting a control circuit, drive circuit, etc. via a bearing section 23. A boss 24 is fixed at the base of the shaft 21. The base end of the shaft 21 abuts against a thrust bearing element 26 which is fixed to a substantially cylindrical and blind angle member 25 fixed underneath the base plate 22.

The bearing section 23 comprises a substantially cylindrical bearing holder 27 which is made of a resin and rests on the plate 22 via a collar 27a, a cylindrical sleeve 28 which is made of metal or similar material having high rigidity and is press-fitted on the inner periphery 27b of the bearing holder 27, as shown in FIG. 1(B), and bearings 29, 29 which comprise ball bearings or sintered oil-impregnated bearings that are attached to the inner periphery 28b of the sleeve 28 and coaxially support the shaft 21 in a rotatable manner inside the sleeve 28. The sintered oil-impregnated bearings are preferably made of resin.

A stator core 31 with wirings 30 provided around each of the salient poles (not shown) is fixed on the outer periphery of the bearing holder 27 near its bottom. It is noted that the sleeve 28 may be formed integral with the bearing holder 27.

A rotor yoke 32 of a U-shape with an open end at the top is fixed on the outer periphery of the boss 24. A rotor magnet 33 is fixed on the inner periphery of the rotor yoke 32 facing the outer periphery of the stator core 31. An annular V groove 24a is formed on the outer periphery of the boss 24, about which is wound a belt 34 that drives a reel table (not shown), etc. to rotate.

Thus, with the bearing section of the present invention, the sleeve 28 made of metal of the like material having a high rigidity is pressed into the bearing holder 27 made of resin, and the bearing holder 27 can be axially aligned with the shaft 21 at a high precision by merely providing on the sleeve 28 bearings 29, 29 that support the shaft 21 in a rotatable manner.

Figure 2:
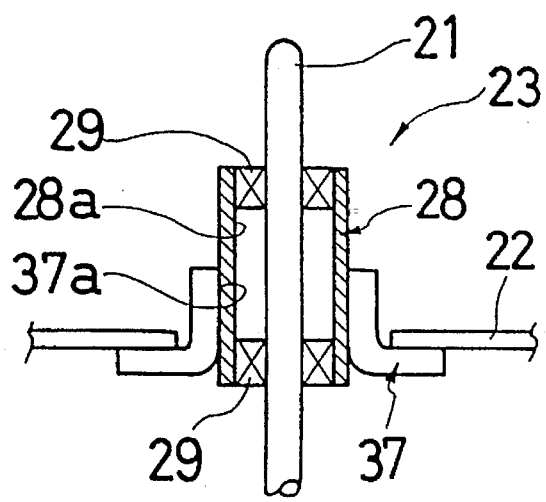
FIG. 2 illustrates a vertical sectional view to show a variation of the bearing holder.
Figure 3:
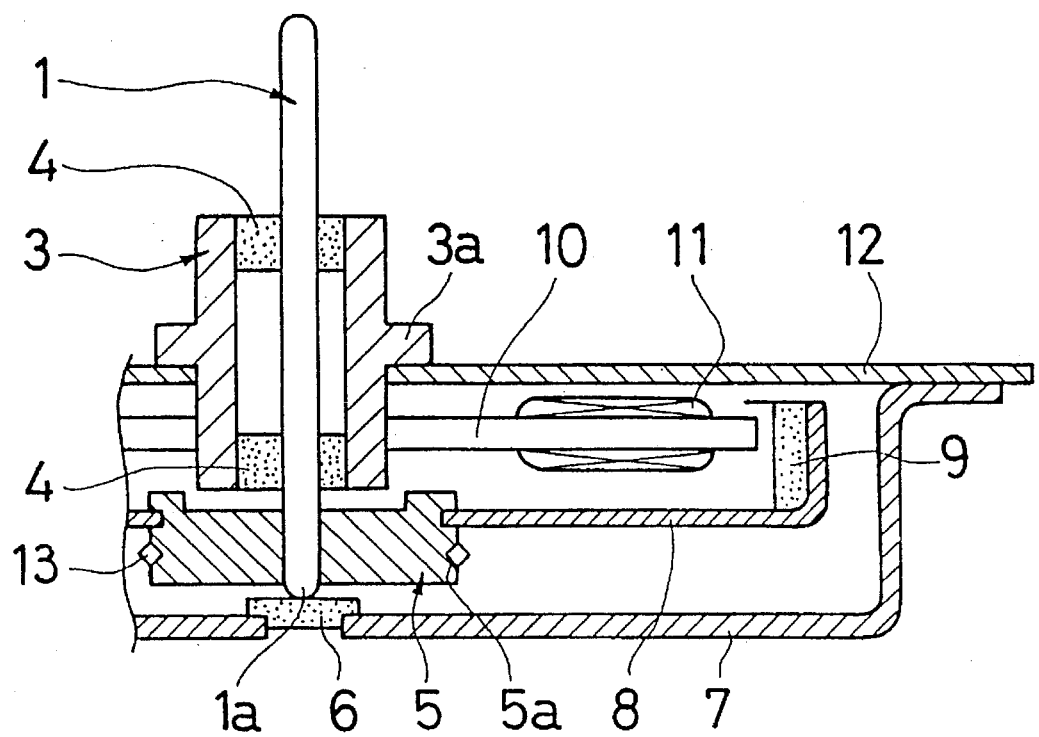
FIG. 3 illustrates a vertical sectional view to show the essential parts of the motor having a conventional bearing mechanism.

The bearing holder 27 is assured of its own rigidity even though it is made of resin, and deflection caused by the side pressure of the pinch roller can be reduced. Moreover, as shown in FIG. 2 for example, a sleeve 28 of the same shape as the first embodiment can easily be fitted in the inner periphery 37a of the bearing holder 37 of a different shape. Accordingly, the same jigs and other equipment may be used for press-fitting the sleeve 28 regardless of changes in the bearing holder. This also means that the sleeve 28 fitted with the bearings 29, 29 can be universally used with different types of bearing holders, and the bearing holders can be machined with less rigid precision. In FIG. 2, component elements that are identical with those of the first embodiment are given the same reference numbers and their description is omitted.

The cylindrical sleeve according to the present invention includes, without limitation, those made of zinc diecast, aluminum diecast, ceramic or resin having high rigidity.

As described above, the present invention comprises a cylindrical sleeve which is press-fitted on the inner periphery of a cylindrical bearing holder, and the bearings are fitted on the inner periphery of the sleeve and which co-axially support a shaft inside the sleeve, so that precise co-axial alignment of the shaft with the bearing holder is facilitated. Moreover, the sleeve can adapt to bearing holders of different shapes.

While the foregoing description and drawings represent the preferred embodiments of the present invention, it will be obvious to those skilled in the art that various changes and modifications may be made therein without departing from the true spirit and scope of the present invention.

What is claimed is:

1. A bearing system comprising:

a motor shaft;

bearings that support said shaft in a rotatable manner;

a cylindrical bearing holder that holds the bearings; and a cylindrical sleeve which is made of metal and is press-fitted on the inner periphery of the bearing holder, said sleeve for providing improved axial alignment of said motor shaft with said bearing holder.

2. A bearing system comprising:

a motor shaft;

bearings that support said shaft in a rotatable manner;

a cylindrical bearing holder that holds the bearings; and a cylindrical sleeve which is made of a material having high rigidity and is press-fitted in the inner periphery of the bearing holder, said sleeve for providing improved axial alignment of said motor shaft with said bearing holder.

3. A bearing system comprising:

a motor shaft;

bearings that support said shaft in a rotatable manner;

a cylindrical bearing holder that holds the bearings; and a cylindrical sleeve which is made of metal and is integrally formed on the inner periphery of the bearing holder, said sleeve for providing improved axial alignment of said motor shaft with said bearing holder.

4. A bearing system comprising:

a motor shaft;

bearings that support said shaft in a rotatable manner;

a cylindrical bearing holder that holds the bearings; and a cylindrical sleeve which is made of a material having a high rigidity and is integrally formed on the inner periphery of the bearing holder, said sleeve for providing improved axial alignment of said motor shaft with said bearing holder.

5. The bearing system as claimed in claims 1, 2, 3 or 4 wherein the cylindrical bearing holder is made of resin.

6. The bearing system as claimed in claims 1, 2, 3 or 4 wherein the bearings are ball bearings.

7. The bearing system as claimed in claims 1, 2, 3 or 4 wherein the bearings are oil-impregnated bearings made of resin.

* * * * *